US008212806B2

(12) United States Patent
Maillot et al.

(10) Patent No.: US 8,212,806 B2
(45) Date of Patent: Jul. 3, 2012

(54) FILE FORMAT EXTENSIBILITY FOR UNIVERSAL RENDERING FRAMEWORK

(75) Inventors: Jérôme Maillot, Montreal (CA); Andre Gauthier, St-Jacques-Le-Mineur (CA)

(73) Assignee: AUTODESK, Inc., San Rafael, CA (US)

(*) Notice: Subject to any disclaimer, the term of this patent is extended or adjusted under 35 U.S.C. 154(b) by 795 days.

(21) Appl. No.: 12/099,753

(22) Filed: Apr. 8, 2008

(65) Prior Publication Data

US 2009/0251478 A1    Oct. 8, 2009

(51) Int. Cl.
*G06T 15/00* (2006.01)
(52) U.S. Cl. ......... 345/418; 345/428; 345/506; 345/558
(58) Field of Classification Search ................ 345/418, 345/428, 506, 558
See application file for complete search history.

(56) References Cited

U.S. PATENT DOCUMENTS

| | | | |
|---|---|---|---|
| 5,481,665 A | 1/1996 | Okada et al. | |
| 5,604,824 A | 2/1997 | Chui et al. | |
| 5,687,304 A | 11/1997 | Kiss | |
| 5,696,892 A | 12/1997 | Redmann et al. | |
| 5,710,878 A | 1/1998 | McCoy et al. | |
| 5,790,131 A | 8/1998 | Liang et al. | |
| 5,835,093 A | 11/1998 | Fujishita et al. | |
| 5,886,701 A * | 3/1999 | Chauvin et al. | 345/418 |
| 5,991,770 A | 11/1999 | Zamora-McKelvy et al. | |
| 6,128,540 A | 10/2000 | Van Der Vegt et al. | |
| 6,151,624 A | 11/2000 | Teare et al. | |
| 6,456,288 B1 * | 9/2002 | Brockway et al. | 345/428 |
| 6,518,989 B1 | 2/2003 | Ishikawa | |
| 6,867,781 B1 * | 3/2005 | Van Hook et al. | 345/506 |
| 6,947,037 B1 | 9/2005 | Lynn et al. | |
| 7,023,437 B1 | 4/2006 | Voorhies et al. | |
| 7,266,616 B1 | 9/2007 | Munshi et al. | |
| 7,307,640 B2 | 12/2007 | Demers et al. | |
| 7,423,653 B2 | 9/2008 | Gettman et al. | |
| 7,523,411 B2 | 4/2009 | Carlin | |
| 7,596,418 B2 | 9/2009 | Bugosh | |
| 7,624,349 B2 | 11/2009 | Seemann et al. | |
| 7,629,985 B2 | 12/2009 | McArdle et al. | |
| 7,701,461 B2 * | 4/2010 | Fouladi et al. | 345/558 |
| 7,878,148 B2 | 2/2011 | Swenson et al. | |
| 2002/0030689 A1 | 3/2002 | Eichel et al. | |

(Continued)

OTHER PUBLICATIONS

"Mental Mill Functional Overview", Mental Images GmbH, White Paper, Feb. 11, 2007. 15 pgs.

(Continued)

*Primary Examiner* — Phu Nguyen
(74) *Attorney, Agent, or Firm* — Patterson & Sheridan, LLP (57) ABSTRACT

Embodiments of the invention provide a method for extending a graphics rendering framework. A rendering application locates a first file that includes a first implementation involving a first graphics material and compares data associated with the first file to data associated with a second file that includes a second implementation involving a second graphics material. The rendering application compares data associated with the first and second files, determines that the first graphics material matches the second graphics material, and determines that the first implementation is different from the second implementation. The data associated with the first file and the data associated with the second file are then combined into a data structure. Advantageously, new graphics materials, and implementations for existing graphics materials, may be created without access to the source code of the original implementation of the graphics materials and may be installed at a later time without re-shipping the entire library of graphics materials and implementations.

18 Claims, 9 Drawing Sheets

U.S. PATENT DOCUMENTS

| | | |
|---|---|---|
| 2002/0039101 A1 | 4/2002 | Fernandez et al. |
| 2003/0031371 A1 | 2/2003 | Kato et al. |
| 2003/0167213 A1 | 9/2003 | Jammes et al. |
| 2003/0226116 A1 | 12/2003 | Kuwata et al. |
| 2004/0109563 A1 | 6/2004 | Evans et al. |
| 2004/0162845 A1 | 8/2004 | Kim et al. |
| 2004/0174998 A1 | 9/2004 | Youatt et al. |
| 2004/0239679 A1 | 12/2004 | Ito et al. |
| 2005/0081161 A1 | 4/2005 | MacInnes et al. |
| 2005/0088447 A1 | 4/2005 | Hanggie et al. |
| 2005/0125747 A1 | 6/2005 | Nelson et al. |
| 2005/0237335 A1 | 10/2005 | Koguchi et al. |
| 2005/0267721 A1 | 12/2005 | Thalhammer-Reyero |
| 2006/0039674 A1 | 2/2006 | Sonoda et al. |
| 2006/0072164 A1 | 4/2006 | Kato et al. |
| 2006/0098023 A1 | 5/2006 | Coulthard |
| 2006/0101431 A1 | 5/2006 | Pepin et al. |
| 2006/0164414 A1 | 7/2006 | Farinelli |
| 2006/0176316 A1 | 8/2006 | Nagasaki et al. |
| 2006/0232583 A1 | 10/2006 | Petrov et al. |
| 2006/0242164 A1 | 10/2006 | Evans et al. |
| 2006/0253214 A1 | 11/2006 | Gross |
| 2007/0018990 A1 | 1/2007 | Shreiner |
| 2007/0018996 A1 | 1/2007 | Wang et al. |
| 2007/0083805 A1 | 4/2007 | Randazzo et al. |
| 2007/0165035 A1 | 7/2007 | Duluk et al. |
| 2007/0195085 A1 | 8/2007 | Farinelli |
| 2007/0233678 A1 | 10/2007 | Bigelow |
| 2007/0268297 A1 | 11/2007 | Novosad |
| 2008/0088630 A1 | 4/2008 | Bakalash et al. |
| 2008/0091491 A1 | 4/2008 | Thorpe et al. |
| 2008/0266296 A1 | 10/2008 | Ramey et al. |
| 2009/0138113 A1 | 5/2009 | Hoguet |
| 2009/0160856 A1 | 6/2009 | Hoguet |
| 2009/0222469 A1 | 9/2009 | Maillot et al. |
| 2009/0251478 A1 | 10/2009 | Maillot et al. |
| 2009/0254611 A1 | 10/2009 | Pena et al. |
| 2009/0265301 A1 | 10/2009 | Chen et al. |
| 2010/0046846 A1 | 2/2010 | Brown |

OTHER PUBLICATIONS

"Bildsynthese" (German), Wikipedia, available at http://de.wikipedia.org/wiki/Bildsynthese, Aug. 2009.

"Grafikpipeline" (German), Wikipedia, available at http://de.wikipedia.org/wiki/Grafikpipeline, Aug. 2009.

"Textur (Computergrafik)" (German), Wikipedia, available at http://de.wikipedia.org/wiki/Textur_(Computergrafik)., Aug. 2009.

"Texture Mapping" (German), Wikipedia, available at http://de.wikipedia.org/wiki/Texture_Mapping, Aug. 2009.

"Image Synthesis," English Translation of "Bildsynthese" (German), Aug. 2009.

"Graphics Pipeline," English Translation of "Grafikpipeline" (German), Aug. 2009.

"Texture (Computer Graphics)," English Translation of "Textur (Computergrafik)" (German), Aug. 2009.

"Texture Mapping," English Translation of "Texture Mapping" (German), Aug. 2009.

* cited by examiner

FILE FORMAT EXTENSIBILITY FOR UNIVERSAL RENDERING FRAMEWORK

BACKGROUND OF THE INVENTION

1. Field of the Invention

The present invention generally relates to computer software. More specifically, the present invention relates to a rendering application configured to perform a renderer-agnostic method for representing graphics assets independently from an underlying rendering engine.

2. Description of the Related Art

The term computer aided design (CAD) refers to a broad variety of computer-based tools used by architects, engineers, animators, video game designers, and other graphics and design professionals. CAD applications may be used to construct computer models or drawings representing virtually any imaginable two-dimensional (2D) or three-dimensional (3D) construct. A rendering application may then be used to generate an image from a CAD model. Rendering is also used to describe the process of calculating effects in a video editing file to produce a final video output.

A rendering application can simulate the appearance of real-world textures, colors, surface shadows, highlights, and reflections by giving the final appearance to the models and animations. As a product, rendering applications come in many forms. Some rendering applications are integrated into larger modeling, animation, simulation, and CAD packages, while others are stand-alone applications. Functionally, a rendering operation is based on a mixture of techniques related to light physics, visual perception, mathematics, and software development.

Rendering applications can be implemented in hardware or software. In the case of software rendering, frequently used for motion picture creation, the actual rendering operation is a computationally intensive process. Typically, animation software rendering is not done in real time because the time to render a single frame is longer than the time that frame is displayed. However, software based rendering may produce very high-quality images, as the renderer is not constrained by frame-rate requirements. In contrast, real-time rendering is frequently used in video games and is often implemented on graphics cards with 3D hardware accelerators.

Software-based rendering engines include Maya, StudioMax, RenderMan, Vray and Mental Ray, among others. Similarly, sophisticated 3D graphics APIs, such as DirectX and OpenGL, may be used to control hardware-based graphics rendering pipelines. Given this assortment of available rendering tools, each having unique advantages and disadvantages, users often desire to use one rendering engine for certain purposes and another rendering engine for other purposes. For example, Mental Ray provides a ray tracing rendering tool, while RenderMan provides a scanline-based rendering tool. Depending on the desired effect, the user may favor one of these rendering approaches over the other.

Typically, to switch between rendering engines, the user must understand the interface and configuration for each rendering engine. For example, to achieve a desired rendering effect using Mental Ray, the user specifies a dynamic library to be loaded, a Mental Ray file describing an interface to a shader, and a set of parameters. Switching to a different rendering engine (e.g., RenderMan) may require the user to specify a completely different set of libraries, files, and parameters corresponding to that other rendering engine. Furthermore, the users of these rendering tools oftentimes do not have a high degree of sophistication in computer programming. For example, architects, illustrators, and engineers, who may be familiar with the desired properties of rendered surfaces (e.g., whether a painted wall surface should have a glossy or matte appearance, or how graveled a concrete pathway should appear), may nonetheless lack an understanding of the rendering interface and configuration needed to achieve these effects using a particular rendering engine.

Currently, attempts at high-level rendering frameworks do not allow for the implementation of different rendering engines. For example, Autodesk® ImageStudio™ makes use of user facades to make rendering more user-friendly. However, ImageStudio™ does not allow for the implementation of multiple renderers.

Also, Mental Images® MetaSL™ (in conjunction with the Mental Mill® application) allows users to write a shader once, and then translate the shader into an appropriate language for rendering using a particular rendering implementation. However, Mental Mill® requires users to implement the shaders in a meta-language that is then translated into the rendering engine language. A further limitation of Mental Mill® is that the source code for translating the meta-language into the particular rendering engine language is stored in a single file that the original author, users, third parties, and customers cannot edit easily. For example, the original author cannot easily extend the shipped file. A third party or an end-user typically cannot augment a file shipped by someone else. Thus, once a MetaSL™ version is shipped by Mental Images®, the MetaSL™ file cannot be subsequently extended to provide support for additional materials or rendering engines without the user or customer being provided the source code.

Accordingly, there remains a need in the art for a technique to efficiently extend rendering applications to enable additional materials to be rendered using an existing rendering engine or to enable existing materials to be rendered using a different rendering engine. Extending the rendering application is done after the rendering application has shipped and independent of third parties who would not normally coordinate their work.

SUMMARY OF THE INVENTION

Embodiments of the invention provide a method for extending a computer framework. An application locates a first file that includes a first implementation involving a first asset and compares data associated with the first file to data associated with a second file that includes a second implementation involving a second asset. The application compares data associated with the first and second files, determines that the first asset matches the second asset, and determines that the first implementation is different from the second implementation. The data associated with the first file and the data associated with the second file are then combined into a data structure.

Advantageously, new assets, and implementations for existing assets, may be created without access to the source code of the original implementation of the assets and may be installed at a later time without re-shipping the entire library of assets and implementations.

DETAILED DESCRIPTION OF THE PREFERRED EMBODIMENTS

Figure 1:
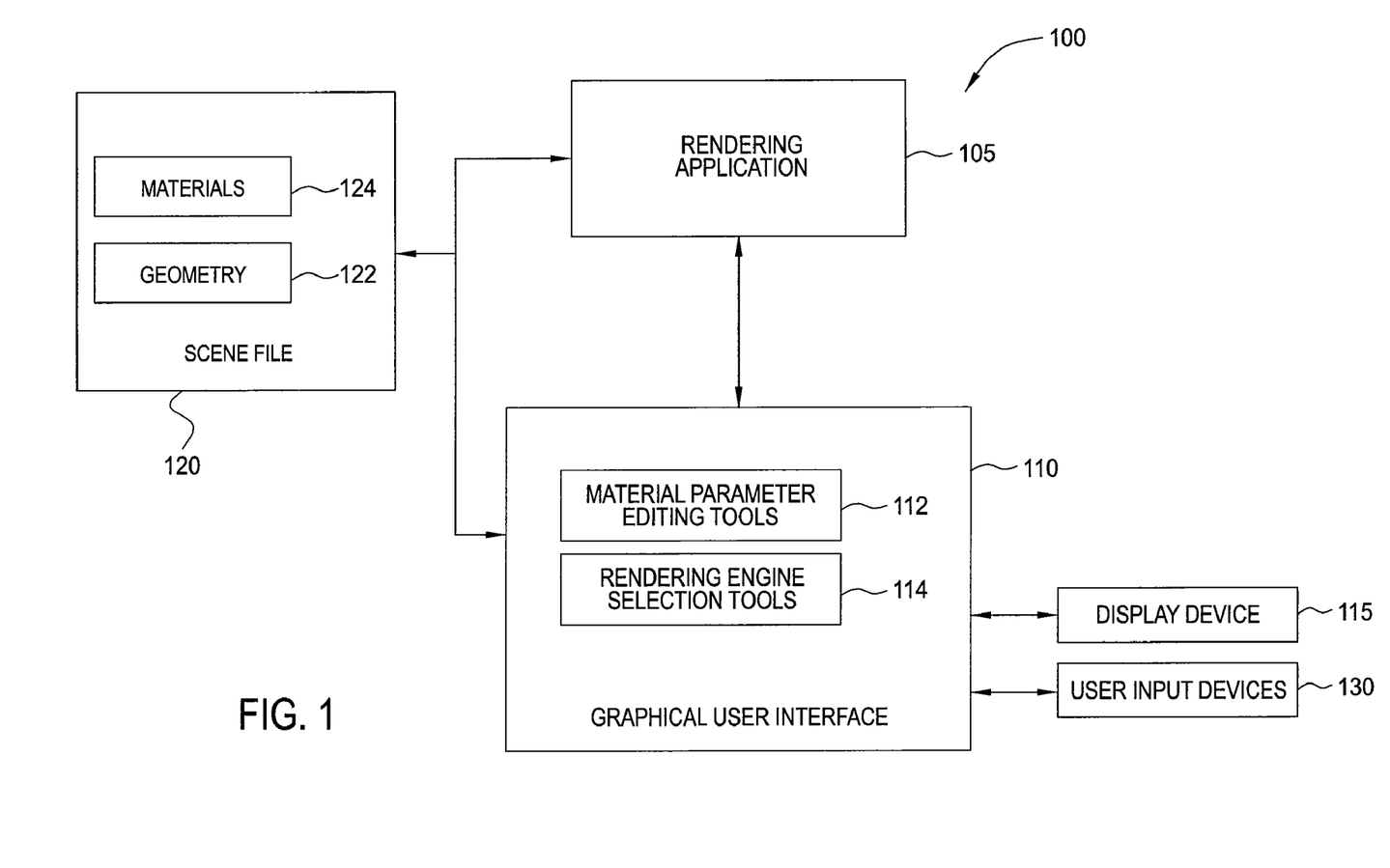
FIG. 1 is a block diagram illustrating components of a rendering application configured to perform a renderer-agnostic method for representing materials independently from an underlying rendering engine, according to one embodiment of the invention.

FIG. 1 is a block diagram illustrating components of a rendering application configured to perform a renderer-agnostic method for representing materials independently from an underlying rendering engine, according to one embodiment of the invention. The components illustrated FIG. 1 may include computer software applications executing on existing computer systems, e.g., desktop computers, server computers, laptop computers, tablet computers, video game consoles, and the like. The software applications described herein, however, are not limited to any particular computing system and may be adapted to take advantage of new computing systems as they become available.

Additionally, the components illustrated in FIG. 1 may be implemented as software applications that execute on a single computer system or on distributed systems communicating over computer networks such as local area networks or large, wide area networks, such as the Internet. For example, a graphical user interface 110 may include a software program executing on a client computer system at one physical location communicating with rendering application 105 at another physical location. Also, in one embodiment, rendering application 105 and graphical user interface 110 may be provided as an application program (or programs) stored on computer readable media such as a CD-ROM, DVD-ROM, flash memory module, or other tangible storage media.

As shown, a system 100 includes, without limitation, rendering application 105, graphical user interface 110, scene file 120, user input devices 130, and a display device 115. Those skilled in the art will recognize, however, that the components shown in FIG. 1 are simplified to highlight aspects of the present invention and that a typical rendering application 105 and GUI interface 110 may include a broad variety of additional tools and features used to compose and manage a design or drawing. Rendering application 105 may be configured to allow users interacting with GUI interface 110 to compose a graphical scene. Accordingly, rendering application 105 and GUI interface 110 may include programmed routines or instructions allowing users to create, edit, load, and save the scene file 120. User input devices 130 may include a mouse pointing device, a keyboard, a joystick or a video game controller and the display device 115 may be a CRT or LCD display.

As shown, the scene file 120 includes geometry 122 and materials 124. Geometry 122 defines the 3D structure or shape of elements included in a scene. For example, the shape of a building or a human character. Typically, the geometry 122 is represented as a collection of polygons defined in a 3D space. As is known, rendering applications 105 frequently provide users with the ability to apply materials 124 to the geometry 122 in the scene file 120. A material 124 is a set of reusable appearance attributes. Using pre-defined materials 124 from a library of materials allows users to quickly change the look and feel of the scene. Materials 124 may be, for example, concrete, brick, wall paint, or any other texture, color, or appearance. Materials 124 are not limited to 2D and may also be volumetric, such as noise and fog. Additionally, materials 124 may correspond to animation data or simulation data that is applied to geometry 122 in the scene file 120.

Graphical user interface 110 provides tools used to manipulate the scene file 120 using rendering application 105, including material parameter editing tools 112 and rendering engine selection tools 114. Those skilled in the art will recognize, however, that the tools of GUI interface 110 shown in FIG. 1 are simplified to highlight aspects of the present invention and that a typical rendering application 105 and GUI interface 110 may include a broad variety of additional tools and features used to compose and manipulate the scene file 120.

Material parameter editing tools 112 may provide graphical user interface elements that allow a user to edit the materials 124 applied to a particular collection of geometry 122 within a scene. The material parameter editing tools 112 may allow the user to define and modify physical, display, animation, simulation, or meta properties of the material 124 to be applied to the particular geometry 122 in scene file 120, generally referred to herein as material parameters. Examples of material display parameters include stroke weight, overshoot, spacing, paper type, hardness, darkness, angle, arc, transparency, texture, color, color variation, or any other parameters used to control the physical, display, animation, simulation, or meta properties of a material 124 applied to the geometry 122 within a scene. Different material parameters may be implemented based on the material 124 being represented and the resulting application for which the scene is rendered. For example, a material 124 representing brick could include height, width, and grout thickness display parameters, whereas a material 124 representing wall paint could include color and finish display parameters. Additionally, when using a simulation application rather than a rendering application, physical properties of the material, in addition to the display properties, may be important to a user that desires the material to bend, stretch, or retain some other physical characteristics when the simulated geometry to which the material is applied is loaded into the simulation application. Physical properties of a material may include heat conductivity, electrical conductivity, how well the material responds to stress, and the flexibility of the material, and other physical characteristics.

In one embodiment, the rendering engine selection tools 114 may provide graphical user interface elements that allow a user to select a particular rendering engine implementation for rendering portions of the geometry 122 from the scene file 120. For example, assume that the rendering application 105 is configured with three rendering engines, each capable of rendering a particular material. Further, each rendering engine may provide two implementations for rendering the material: a first, high-speed, low-quality implementation and a second, low-speed, high-quality implementation. In this example, there are a total of six implementations capable of rendering the particular material. In such a case, the rendering engine selection tools 114 allow the user to select which implementation to use for rendering a given image from a list of available implementations.

In another embodiment, the rendering engine selection tools 114 may automatically select which rendering implementation to use for rendering based on some user selected context, preferences, or profile. For example, a user may select between "high quality" and "low quality" rendering, and the rendering application 105 determines which rendering implementation and which rendering engine is most appropriate for rendering the scene.

Figure 2:
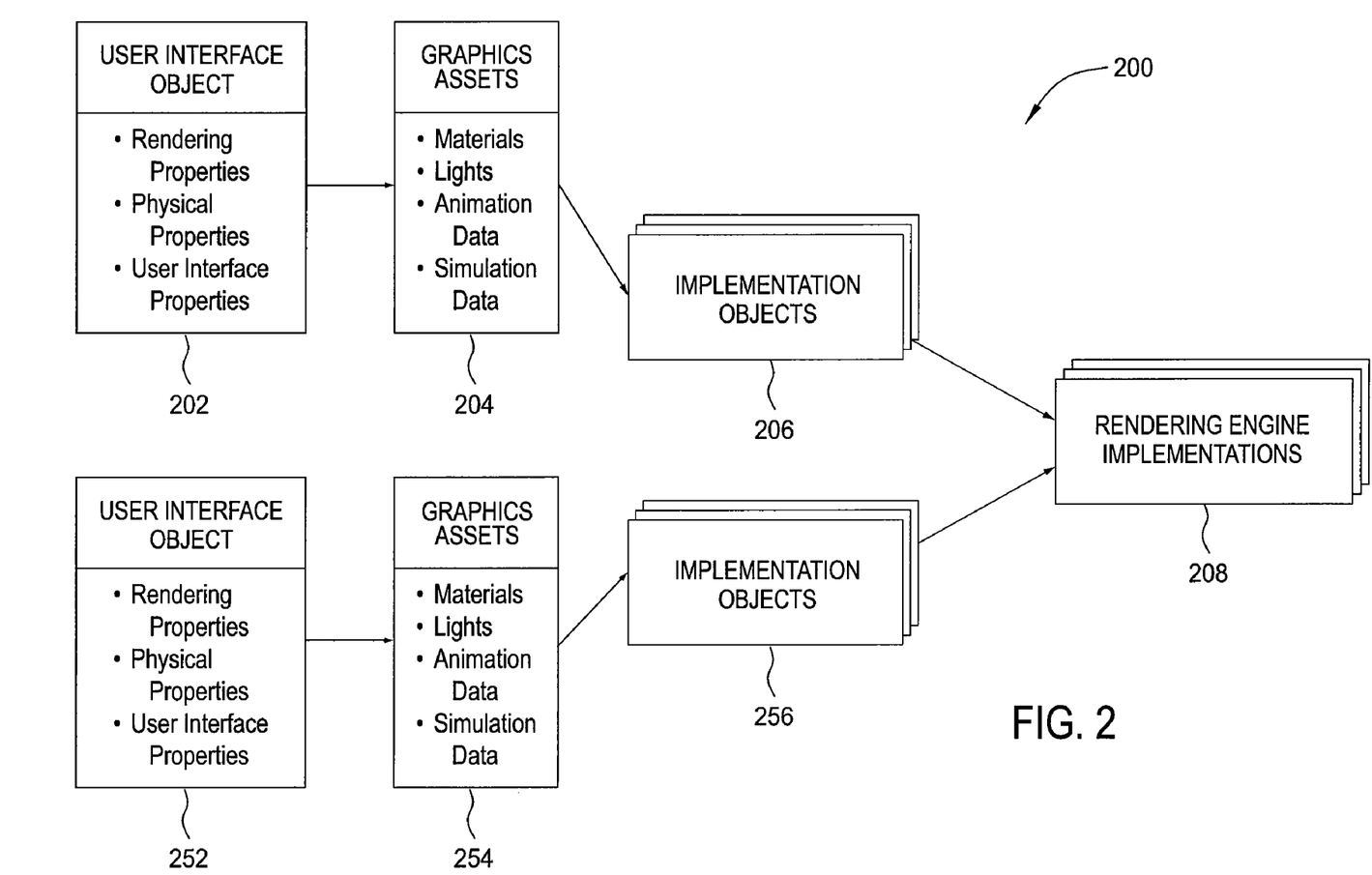
FIG. 2 is a conceptual drawing illustrating components of a system configured for rendering a graphics scene using a universal rendering framework, according to one embodiment of the invention.

FIG. 2 is a conceptual drawing illustrating components of a system configured for rendering a graphics scene using a universal rendering framework 200, according to one embodiment of the invention. As shown, a graphics application may be configured with the rendering framework 200 having four components: a collection of user interface objects 202, 252, a collection of graphics assets 204, 254, a collection of implementation objects 206, 256 for each graphics asset 204, 254, and a collection of underlying execution engine implementations 208. In one embodiment, execution engine implementations 208 comprise rendering engine implementations used when rendering geometry in a graphics scene. The rendering engine implementations 208 may be software-based (e.g., Mental Ray and RenderMan), as well as graphics API-based (e.g., OpenGL and DirectX) which are used to control different hardware rendering pipelines.

Each asset defines a framework for storing data to be used when executing an application program. Graphics assets 204, 254 define a framework for storing graphics data to be used when executing a rendering application. Graphics assets 204, 254 may represent graphics materials, lights, animation data, or simulation data. Common examples of graphics materials represented by graphics assets 204, 254 include a painted wall material, concrete materials, metal materials, glass materials, and water materials, etc. In one embodiment, each object in a graphics scene is composed of one or more pieces of geometry, e.g., a collection of triangles or polygons. Each piece of geometry may also be associated with a graphics asset to use in rendering that piece of geometry.

Each graphics asset 204, 254 may include strongly-typed parameters representing the relevant characteristics of a given graphics asset. For example, a graphics asset 204, 254 corresponding to a painted wall surface could include parameters for color, application or brush type, and finish. In a second example, a graphics asset 204, 254 corresponding to a fluorescent light could include graphics parameters for light intensity or color temperature when rendering the asset. The fluorescent light asset could also include a physical parameter for wattage, to be used by a simulation or animation application. Because the parameters of the graphics asset are strongly-typed, users can easily identify the characteristics to use in rendering or simulating a given graphics asset. The specific parameters for that graphics asset corresponding to an underlying rendering engine, simulation engine, or animation engine need not be known to the user.

In addition, by strongly typing the parameters to the characteristics of the graphics asset 204, 254, the user interface objects 202, 252 may present the user with the appropriate user interface constructs, regardless of the underlying implementation object 206, 256 or rendering engine implementations 208. For example, continuing with the example of a graphics asset 204, 254 corresponding to a graphics material resenting a painted wall surface, the user interface object 202 may present the user the a color type parameter using interface elements that allow a user to specify an RGB color value, a code reference to a manufacturer catalog, or even sampled spectral values. Similarly, the user interface objects 202, 252 may present the user with drop-down lists for the application type and finish parameters. These drop-down lists could present values for a painted surfed familiar to an architect or designer, such as rolled, sprayed, brushed, matte, glossy, satin, etc. By decoupling the user interface from the graphics material, the rendering framework enables different applications to adapt the user interface to the skills of the user. For example, a typical Autodesk® Revit® user will prefer to enter colors from a catalog while an Autodesk® 3ds Max® user may prefer to enter RGB values.

Implementation objects 206, 256 provide an interface between a given graphics asset 204, 254 and a given rendering engine 208. Generally, the implementation objects 206, 256 are configured to receive values for the strongly-typed parameters and also to translate these values into an appropriate format for one of the rendering engine implementations 208 to achieve a desired rendering effect. The translation may be a simple pass-through, such as in the case of passing of RGB color values, but can also be a mapping from one value to another. That is, depending on the desired rendering effect, the underlying implementation object 206, 256 may generate multiple parameters from a single material parameter, may identify libraries, files, shader programs, textures, rendering parameters, or any other values used by a particular rendering engine implementation 208 to achieve a desired effect. By decoupling the rendering engine implementation 208 from the graphics assets 204, 254, the rendering framework may be extended with additional rendering engine implementations 208 by adding the appropriate implementation objects 206, 256 to each additional rendering engine 208 to render existing graphics assets 204, 254, presented to the user through user object interface 202, 252. Further, the rendering framework is also designed to be easily extended with new materials for existing rendering engines, as described in greater detail in FIGS. 7 and 8 below.

In addition to extending a rendering application to render graphics assets 204, 254, the framework applies to extending simulation or animation application. For example, physical properties of assets may be matched to several simulation engines, including multiple fluid simulators. A first fluid simulator may be optimized for speed, and a second fluid simulator may be optimized for correctness.

Figure 3:
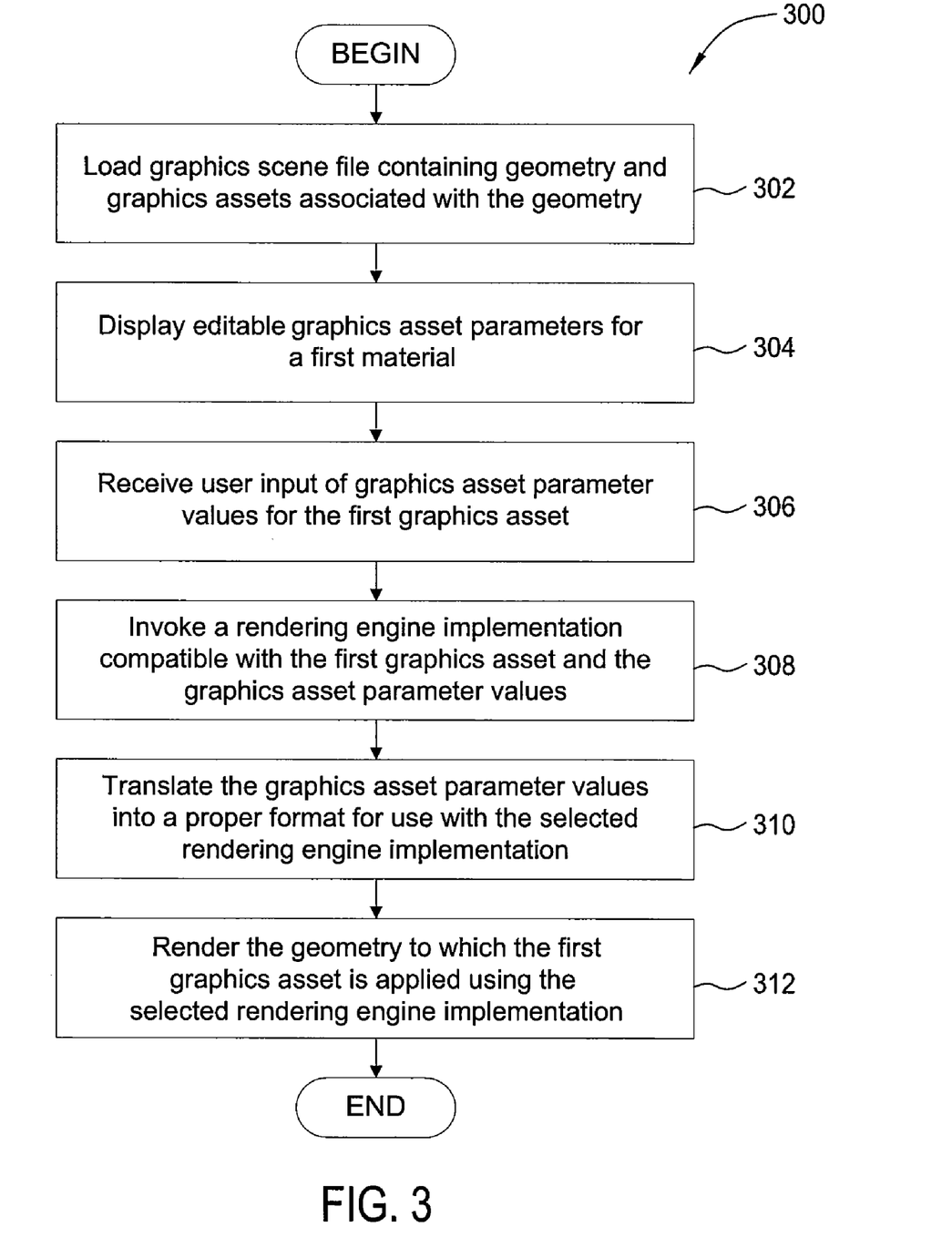
FIG. 3 is a flow diagram of method steps for representing materials independently from an underlying rendering engine, according to one embodiment of the invention.

FIG. 3 is a flow diagram of method steps for representing materials independently from an underlying rendering engine, according to one embodiment of the invention. Persons skilled in the art will understand that even though the method is described in conjunction with the systems of FIGS. 1 and 2, any system configured to perform the steps of the method illustrated in FIG. 3, in any order, is within the scope of the present invention.

As shown, the method 300 begins at step 302, where the graphics application loads a graphics scene file containing geometry and graphics assets associated with the geometry. In one embodiment, each object in a graphics scene is composed of one or more pieces of geometry, e.g., a collection of triangles or polygons. Each piece of geometry may also be associated with a graphics asset to use in rendering that piece of geometry.

At step 304, the rendering application displays editable graphics asset parameters for a first graphics asset. As discussed above, each graphics asset may have different editable parameters based on the characteristics of the graphics asset.

At step 306, the rendering application receives user input of graphics asset parameter values for the first graphics asset. The graphics asset parameter values may be input numerically, chosen from a drop-down menu, or selected in another manner. Further, in one embodiment, the graphics asset parameter values may be pre-set at default values for a given graphics asset and then modified by the user to achieve the desired effect.

At step 308, the rendering application invokes a rendering engine implementation compatible with the first graphics asset and the graphics asset parameter values supplied at step 306. As described above, multiple rendering engines, and multiple rendering implementations for each rendering engine, may be available for rendering the first graphics asset. In one embodiment, the user may select the implementation and rendering engine to be invoked by the graphics application, based on what implementations of the first graphics asset are available for a set of available rendering engines. Alternatively, the rendering engine may be invoked by the graphics application based on a user-selected context. For example, the user may select "high quality" rendering or "low quality" rendering, and the rendering application determines the appropriate rendering implementation to invoke when rendering.

In yet another embodiment, the rendering application may invoke a different rendering implementation for each graphics asset to be rendered. Based on the context in which the user is rendering, the rendering application may invoke an appropriate rendering engine and implementation. For example, if rendering an interactive application and rendering into an interactive view, then the rendering application may automatically invoke the fastest and lowest quality rendering implementation. Also, if rendering offline, the rendering application may invoke the highest quality implementation because rendering time may be less of a factor.

At step 310, the rendering application translates the graphics asset parameter values into a format required for use with the rendering implementation selected at step 308. For example, the implementation objects 206, 256, shown in FIG. 2, may use a translation table that maps from the strongly-typed graphics asset parameters values into the appropriate values used by the rendering implementation selected at step 308. At step 312, the rendering application renders the geometry to which the first graphics asset is applied using the selected rendering engine. As described above, each graphics asset specified for portions of a scene may be rendered using a different rendering implementation.

Figure 4:
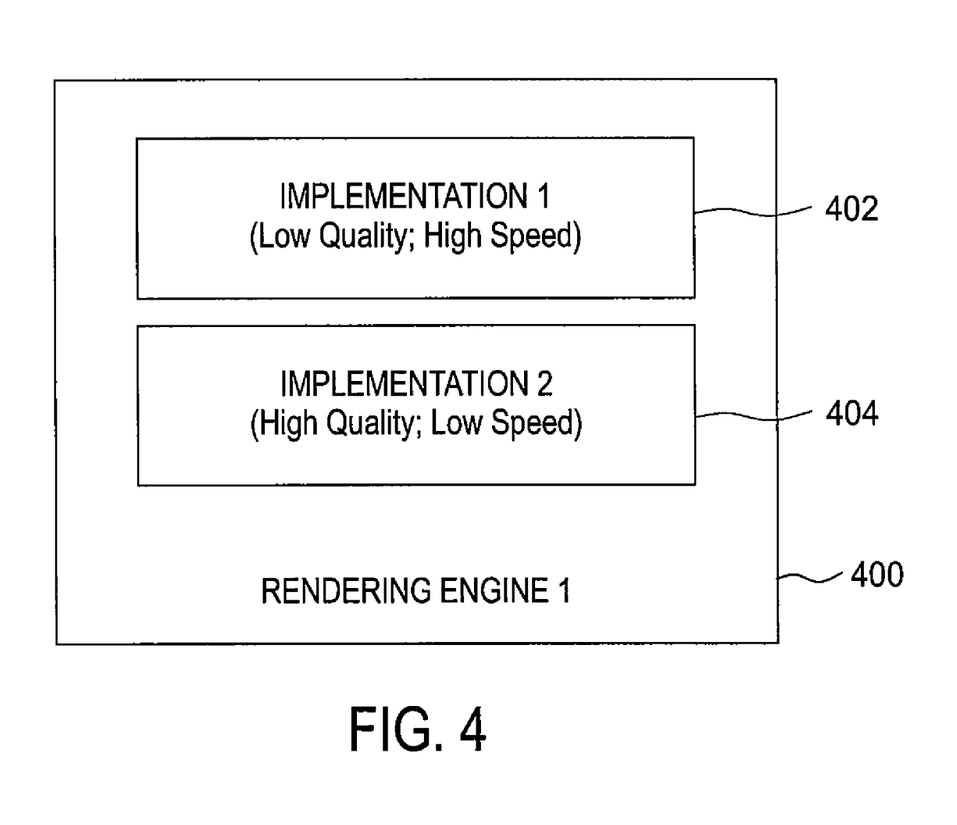
FIG. 4 is a block diagram illustrating multiple implementations of a rendering engine, according to one embodiment of the invention.

FIG. 4 is a block diagram illustrating multiple rendering implementations of a single rendering engine, according to one embodiment of the invention. Illustratively, rendering engine 400 includes first rendering implementation 402 and a second rendering implementation 404. As shown, the first rendering implementation 402 provides a low-quality, high-speed rendering implementation for a given material. This implementation may be appropriate when rendering in real-time, e.g., to give the user a quick impression of the appearance of a given graphics asset within a scene. The second rendering implementation 404 may be a high-quality, low-speed rendering implementation. This implementation may be appropriate when rendering a final version of a scene, giving more fine-grained results.

Figure 5:
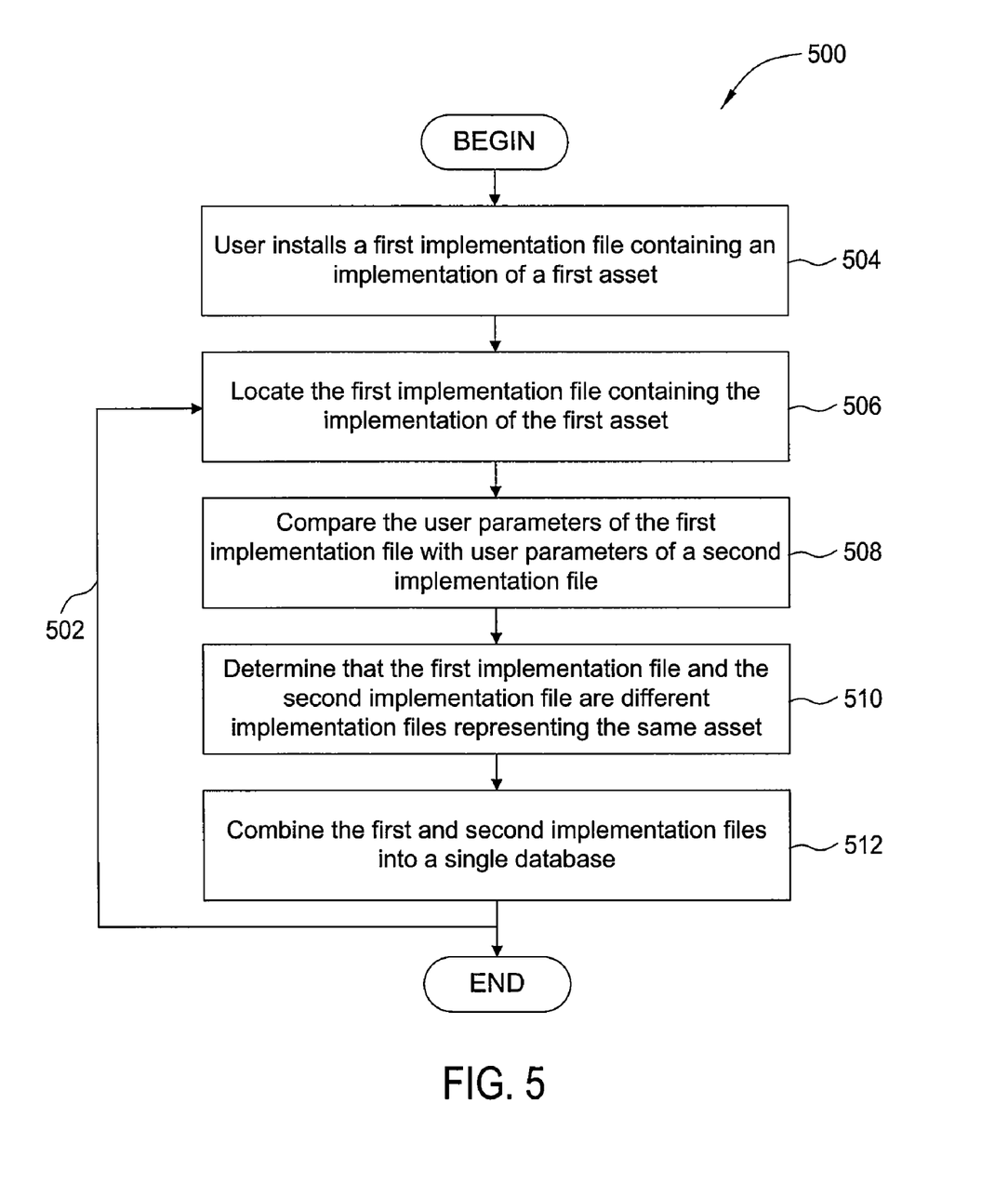
FIG. 5 is a flow diagram of method steps for extending a rendering application to support additional rendering implementations for an existing graphics asset, according to one embodiment of the invention.

FIG. 5 is a flow diagram of method steps for extending a rendering application to support additional rendering implementations for an existing graphics asset, according to one embodiment of the invention. Persons skilled in the art will understand that even though the method is described in conjunction with the systems of FIGS. 1-4 any system configured to perform the steps of the method illustrated in FIG. 5, in any order, is within the scope of the present invention.

At step 504, the user installs a first implementation file containing an implementation of a first graphics asset. In one embodiment, the implementation corresponds to an additional rendering engine implementation of an existing graphics asset. For example, a wall paint material may already be implemented in Mental Ray, and the first implementation file contains an additional implementation for the wall paint material in a different rendering engine, e.g., RenderMan. In another embodiment, the implementation may correspond to an additional graphics asset for an existing rendering engine implementation. For example, a granite tile material may already be implemented in Mental Ray, and the implementation file may contain an implementation of a ceramic tile material, also for Mental Ray.

In yet another embodiment, the first implementation file may contain implementations for multiple graphics assets for the rendering engine implementation. For example, the first implementation file may contain a series of implementations related to masonry materials, including a granite material, a ceramic material, and a cement material, where each such implementation may be configured to operate using the same rendering engine, e.g., Mental Ray.

At step 506, the rendering application locates the first implementation file containing the implementation of the first asset. Locating the first implementation file on disk may include searching a list of directories where implementations are saved, searching default directories for the rendering application, or searching the contents of an environment variable that the user can define.

At step 508, the rendering application compares the user parameters of the first implementation file with the user parameters of a second implementation file. The second implementation file may contain a "contract" that the first implementation file should adhere to in order to be recognized as an additional implementation for the same graphics asset. For example, the second implementation file may contain a "contract" for a wall paint material having three parameters: color, application type, and finish. In one embodiment, if the first implementation file contains an implementation for a material having parameters color, application type, and finish, then the rendering application recognizes that the first implementation file contains an additional implementation for the wall paint material. The comparison may be performed in a variety of ways, including, without limitation: (a) comparing an implementation ID of the first implementation file with an implementation ID of the second implementation file, (b) comparing a name/description of the first implementation file with a name/description of the second implementation file, (c) comparing user-editable parameters of the first implementation with user-editable parameters of the second implementation file, or (d) comparing the types of the user-editable parameters of the first implementation with the types of the user-editable parameters of the second implementation file. These various approaches are described in greater detail below in FIGS. 6A-6D.

At step 510, the rendering application determines that the first implementation file and the second implementation file are different implementations of the same graphics asset. The determination is made based on the comparison performed at step 508.

At step 512, after the first and second implementation files are determined to be different implementations of the same graphics asset, the rendering application combines the first and second implementation files into a single database in memory. In one embodiment, the database may be stored as a hash table that indicates that a first rendering engine corresponds to a first implementation, a second rendering engine corresponds to second implementation, and so on.

The steps 506-512 may be performed at run-time, when a user invokes a rendering operation to be performed on a graphics scene file containing geometry with corresponding graphics assets. Furthermore, steps 506-512 may be repeated a number of times for each additional implementation located in the system, as indicated by looping arrow 502.

FIGS. 6A-6D illustrate the step of comparing a first implementation file with a second implementation file, according to various embodiments of the invention. As persons skilled in the art will recognize, each figure sets forth a different way to perform step 508 of FIG. 5, previously described herein.

Figures 6A, 6B:
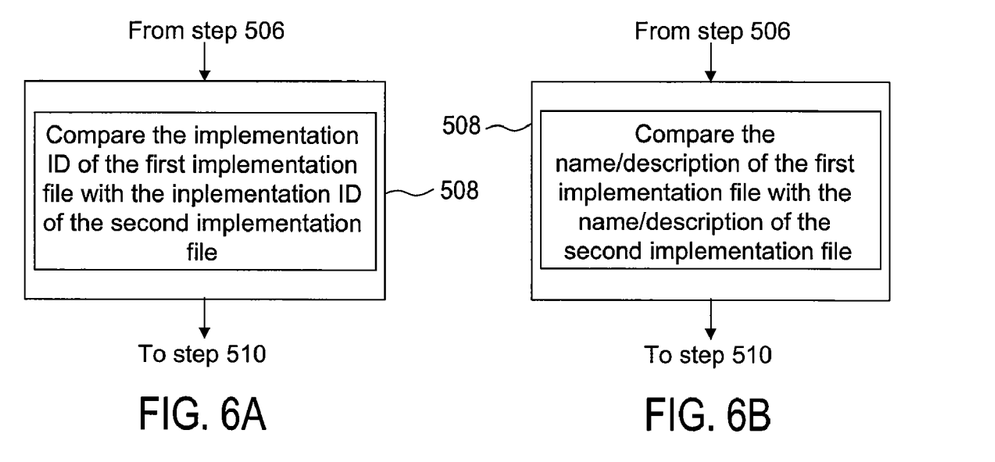
FIGS. 6A-6D illustrate the step of comparing a first implementation file with a second implementation file, according to various embodiments of the invention.

In FIG. 6A, the rendering application compares an implementation ID of the first implementation file with an implementation ID of the second implementation file. For example, a wall paint material may be associated with a numerical implementation ID. When comparing implementation files, if the numerical implementation ID for the first implementation file matches the numerical implementation ID for the wall paint material, then the first implementation file is determined to contain an additional implementation of the wall paint material.

In FIG. 6B, the rendering application compares a name/description of the first implementation file with a name/description of the second implementation file. The name/description may be a string or characters. For example, a wall paint material may be associated with a description "wall_paint_1". When comparing implementation files, if the description for the first implementation file matches the description for the wall paint material (i.e., "wall_paint_1"), then the first implementation file is determined to contain an additional implementation of the wall paint material.

Figures 6C, 6D:
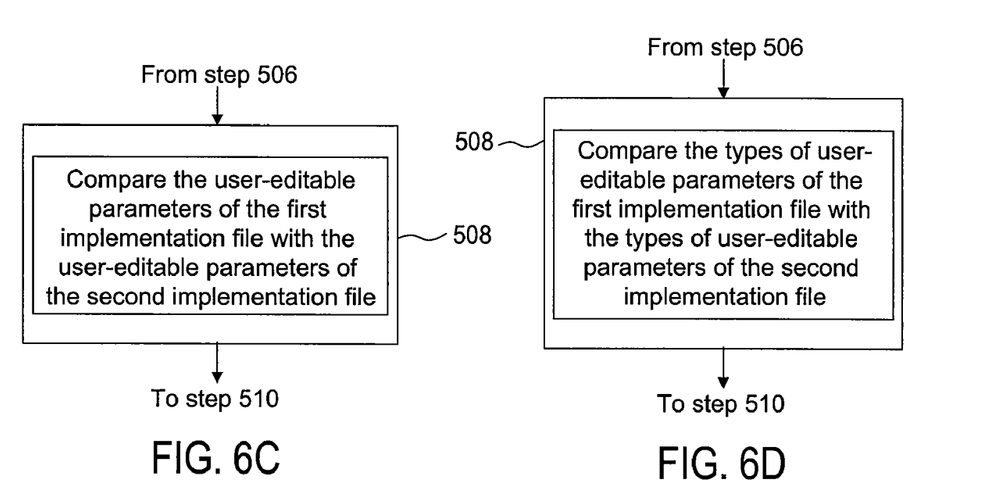

In FIG. 6C, the rendering application compares user-editable parameters of the first implementation file with user-editable parameters of the second implementation file. In one embodiment, each graphics asset may include strongly-typed parameters representing the relevant characteristics of a given graphics asset. For example, a graphics asset corresponding to a wall paint material may include parameters for color, application type, and finish. When comparing implementation files, if the strongly-typed parameters for the first implementation file match the strongly-typed parameters for the wall paint material (i.e., color, application type, and finish), then the first implementation file is determined to contain an additional implementation of the wall paint material.

In FIG. 6D, the rendering application compares the types of the user-editable parameters of the first implementation file with the types of the user-editable parameters of the second implementation file. For example, a graphics asset corresponding to a wall paint material may include parameters for color, application, and finish. The color parameter may include a "numerical type" and the application and finish parameters may include "drop-down menu types." When comparing implementation files, if the types of the parameters for the first implementation file match the types of the parameters for the wall paint material (i.e., color has numerical type, and application and finish have drop-down menu types), then the first implementation file is determined to contain an additional implementation of the wall paint material.

Figure 7:
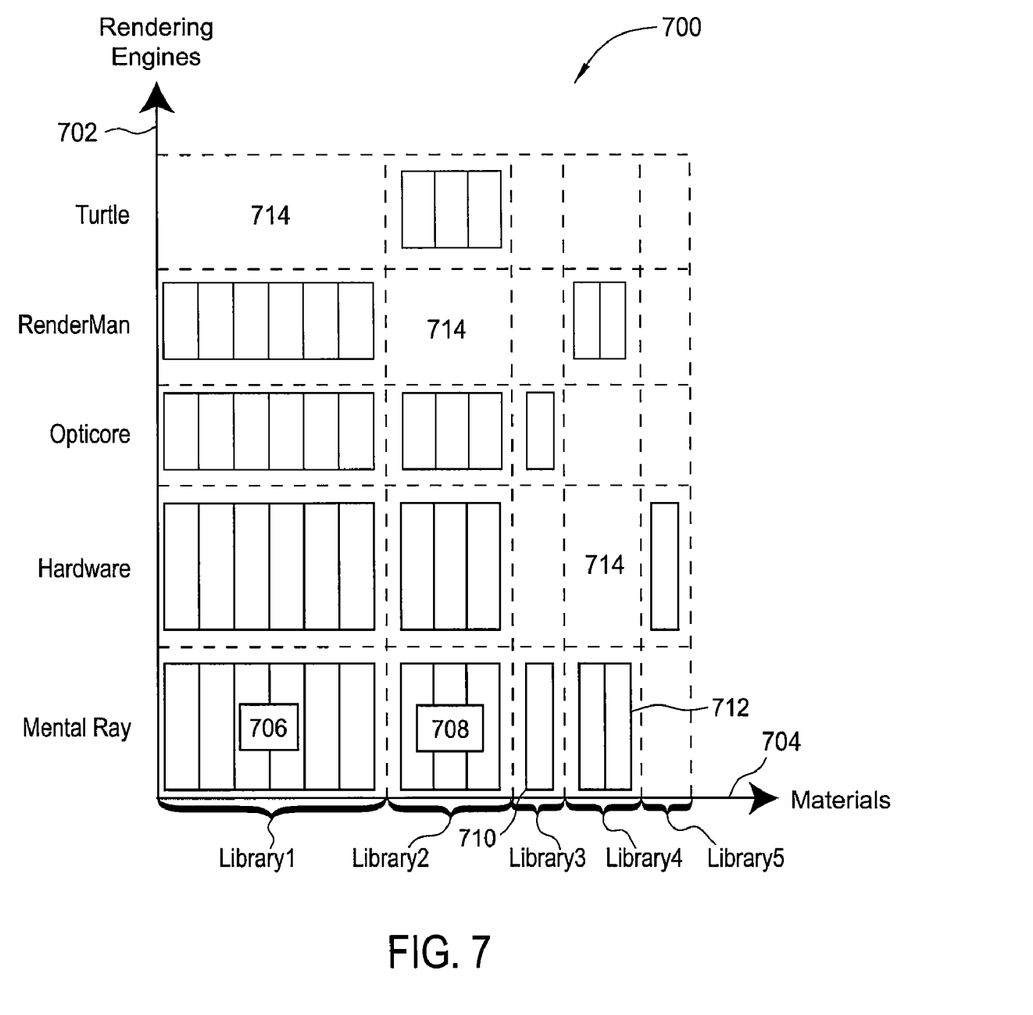
FIG. 7 is a conceptual drawing illustrating a rendering framework 700 supported and unsupported implementations for rendering graphics assets, according to one embodiment of the invention.

FIG. 7 is a conceptual drawing illustrating a rendering framework 700 with supported and unsupported implementations for rendering graphics assets, according to one embodiment of the invention. The rendering framework 700 is extensible along two axes: a materials axis 704 and a rendering engines axis 702. For example, a first entity (e.g., Autodesk) may ship a product that implements twenty materials for rendering with Mental Ray in a library. A file 706 contains the Mental Ray implementations for these twenty materials. For example, file 706 may contain a series of implementations for masonry materials, each implemented in Mental Ray. The library is extensible along the horizontal materials axis 704 by installing new files which implement new materials for Mental Ray, files 708, 710, 712.

Similarly, the rendering framework 700 is also extensible along the vertical rendering engines axis 702, which represents support for newly implemented rendering engines for existing materials. For example, assume the same twenty materials that shipped with the original product using Mental Ray implementations (file 706) are later implemented in hardware, Opticore, RenderMan, or another rendering engine. Users or customers of the rendering framework 700 may install the implementation files corresponding to these additional implementations of the masonry materials without knowledge of the source code for the original implementation file 706. As long as the additional implementation files adhere to the "contract" provided by the file 706 for each of the materials, then the rendering framework 700 recognizes these new rendering options are available for these materials and presents the option to the user to render using these additional rendering engines in a common user interface.

As described, each of the files 706, 708, 710, 712 represents separate files on disk that are installed individually. At runtime, the rendering application identifies which materials and rendering engines are present in a given environment and the user does not need to know where all the implementations are coming from. Because the files are organized in a compartmentalized way, each file may be shipped individually, one after another, which is especially important when the implementation file is created by a third party (e.g., Pixar's Renderman implementation of a series of materials) and not on a common release schedule with the original product containing the rendering framework 700.

However, as also shown in FIG. 7, there may be gaps 714 in the matrix of materials and rendering engines. This results because a particular set of materials may not be implemented in a given rendering engine. The method 500, described in FIG. 5, may be configured to determine which materials are available in each rendering engine. For example, if the selected rendering engine is RenderMan, but a first material in the scene (e.g., wall paint) has no RenderMan implementation, then there may be an explicit fall-back material that is used. If no fall-back material is specified, a default fall-back material may be applied instead (i.e., a solid color). This functionality deals with incomplete definitions (i.e., missing pieces in the "matrix").

In an another embodiment, an alternative technique for resolving missing implementations when rendering a given graphics scene is to flag each the materials that are not supported by the selected rendering engine, remove or hide the objects with those materials from the scene, and create a separate set of objects that is rendered separately in a second rendering pass. In such a case, the user may manually resolve what material to apply to the separate set of objects during the second pass.

Figure 8:
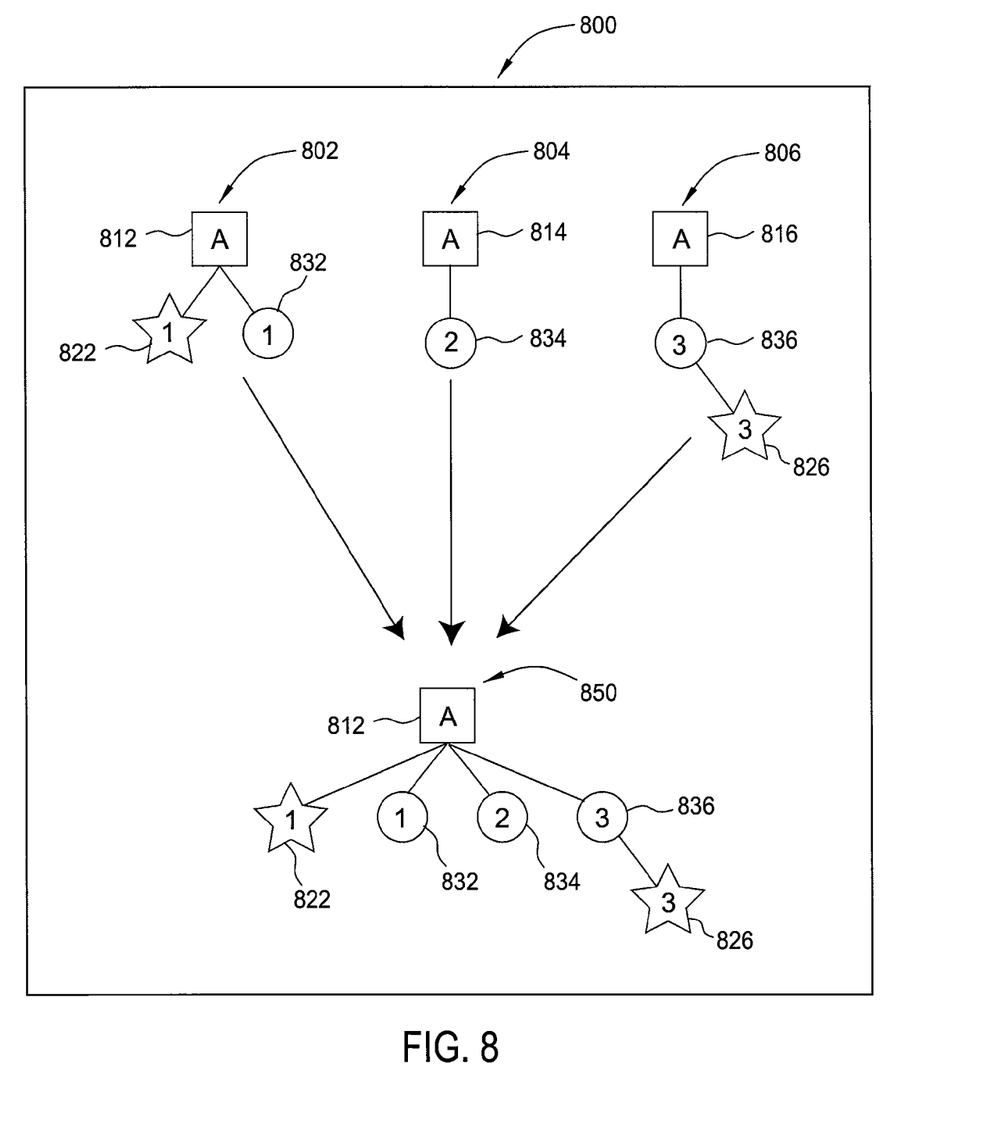
FIG. 8 is a conceptual drawing illustrating combining three implementation files into a data structure in memory, according to one embodiment of the invention.

FIG. 8 is a conceptual drawing illustrating combining three implementation files into a data structure in memory, according to one embodiment of the invention. In one embodiment, the conceptual drawing illustrates step 512 of FIG. 5. The conceptual drawing demonstrates an example of a rendering environment 800 that includes files 802, 804, 806 that have been installed and are stored on disk. The files 802, 804, 806 include three types of objects: material objects (squares 812, 814, 816), user interface objects (stars 822, 826), and implementation objects (circles 832, 834, 836). Multiple implementations are then combined into a single data structure 850 in memory. For example, rather than storing the material objects 812, 814, 816 as three separate objects in memory, with one for each implementation, the material objects 812, 814, 816 are registered together and combined into a single data structure 850 in memory that includes one material object 812 associated with a default user interface object 822 and three implementation objects 832, 834, 836.

The material object 812 acts like a "contract." For example, in order for a later-installed material object 814, 816 to be compliant with the wall paint material object, the implementation must include each of specific parameters of the wall paint material object. As shown, the material object 812 includes implementation object 832 and default user interface object 822. Material object 814, installed later, does not include a corresponding user interface object. In one embodiment, later-installed materials object do not require a user interface object because the default user interface object 822 is simply passed through to memory for that material object. In another embodiment, a later-installed material object 816 may include an additional user interface object 826 such that the rendering engine includes an override for the default user interface object 822 for the material as well as the ability to define a unique user interface when creating the additional implementation.

Creating additional implementations for existing materials may be done using an Application Programming Interface (API) and scripting language. The API may allow content providers to query for existing material objects and parameters, returning default values, min/max values, user interface data, order of parameters, grouping of parameters, dimming/hiding logic for parameters, etc. To create an additional implementation of a material, creators may begin with the existing implementation object and simply modify the translation table to implement an additional renderer.

Figure 9:
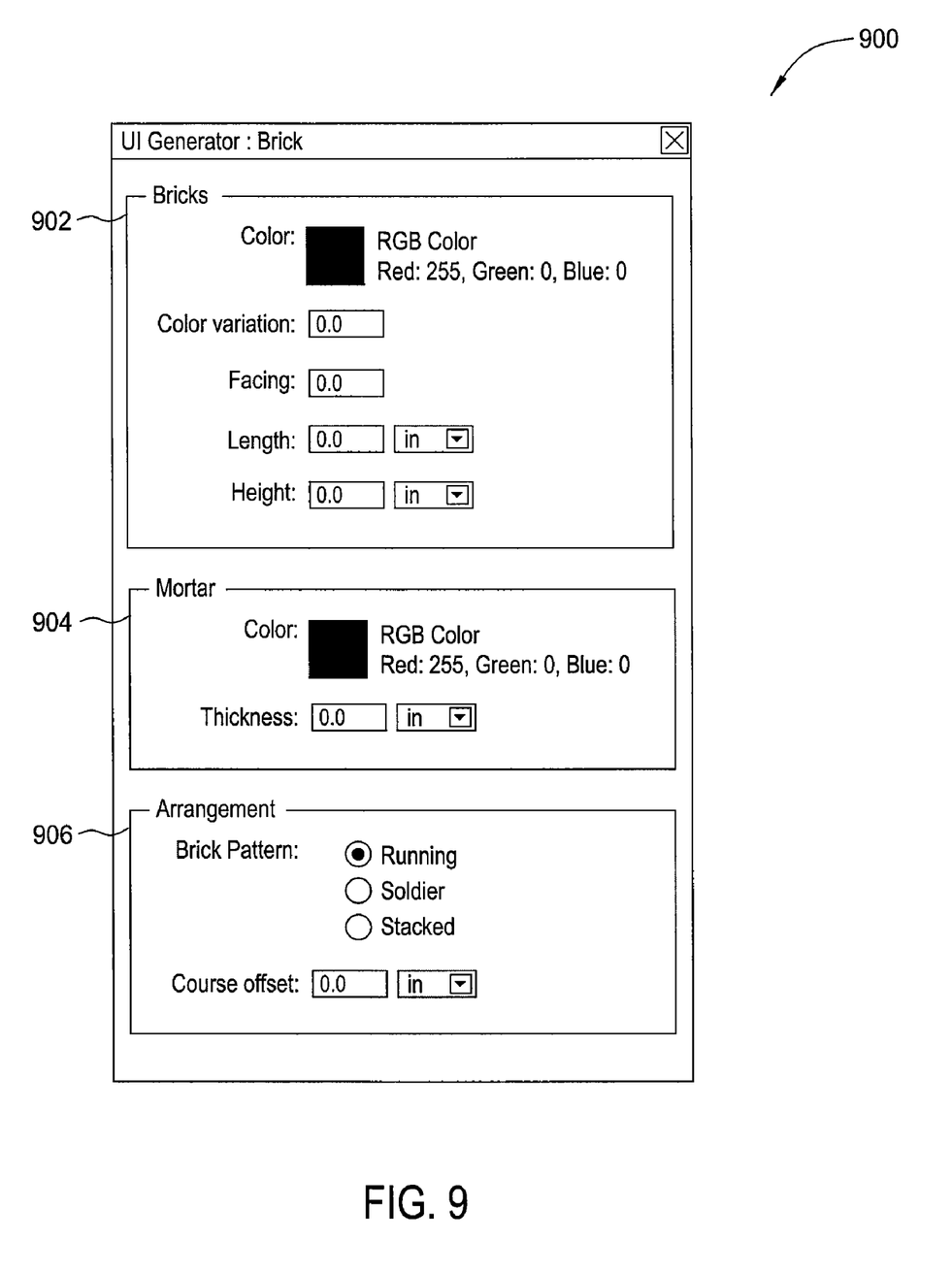
FIG. 9 is a screen shot illustrating a user interface for a brick material, according to one embodiment of the invention.

FIG. 9 is a screen shot illustrating an example user interface 900 for a brick material, according to one embodiment of the invention. In this example, the user interface 900 displays three groups of parameters, a bricks group 902, a mortar group 904, and an arrangement group 906. The bricks group 902 provides editable material parameters of color, color variation, facing, brick length, and brick height. The mortar group 904 provides editable material parameters of color and mortar thickness. The arrangement group 906 provides editable material parameters of brick pattern and course offset. Persons skilled in the art will recognize that even though the brick material user interface 900 is described with these specific editable user parameters and groups, other user parameters and groups may be used within the scope of the present invention. More generally, as described above, the editable material parameters may be both strongly-typed and tailored to the properties of the material represented by a material object. Thus, in various embodiments, a user may achieve a desired rendering effect by modifying the material parameters.

As described herein, embodiments of the invention provide a renderer-agnostic method for representing graphics assets independently from an underlying rendering engine. Advantageously, graphics asset libraries may be extended with new graphics assets for rendering with an existing rendering engine and implementation. Also, new rendering engines and implementations may be added for existing graphics assets.

Thus, at run-time, rather than limiting the rendering to being performed on a pre-determined rendering engine, the rendering application may efficiently and conveniently manage rendering a graphics scene on a plurality of rendering engines or implementations. Because of installation and release schedule issues, the implementations may be installed in separate files and at a later time, without access to the source code of the rendering framework or original material object implementations. Advantageously, embodiments of the invention support third-party material implementations without relying on a product release schedule of the third-party. The library of available rendering implementations for materials can be updated any time by installing new implementation files that are combined at runtime into a single database. This extensibility is not possible with prior art systems, like Mental Mill, because the MetaSL code would need to be updated whenever an additional implementation was created and would require re-shipping the entire MetaSL library.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for extending a computer framework, the method comprising:

locating a first file that includes a first implementation involving a first asset associated with the computer framework, wherein each asset defines a framework for storing data to be used when executing an application program, and each implementation provides a translation between one of the assets and a different underlying execution engine;

comparing data associated with the first file to data associated with a second file, wherein the second file includes a second implementation involving a second asset associated with the computer framework;

determining that the first asset matches the second asset;

determining that the first implementation provides a translation between the first asset and a first execution engine and that the second implementation provides a translation between the second asset and a second execution engine that is different than the first execution engine; and combining the data associated with the first file and the data associated with the second file into a data structure.

2. The method of claim 1, wherein each asset comprises an animation data asset, a simulation data asset, or a graphics asset.

3. The method of claim 2, wherein the first asset comprises a first graphics material to be applied to geometry in a graphics scene when rendering the graphics scene, and the second asset comprises a second graphics material to be applied to geometry in the graphics scene when rendering the graphics scene.

4. The method of claim 3, wherein the first graphics material matches the second graphics material if an identification number associated with the first graphics material matches an identification number associated with the second graphics material.

5. The method of claim 3, wherein the first graphics material matches the second graphics material if a material name associated with the first graphics material matches a material name associated with the second graphics material.

6. The method of claim 3, wherein the first graphics material matches the second graphics material if material parameters associated with the first graphics material match material parameters associated with the second graphics material.

7. The method of claim 6, wherein each of the material parameters of the first graphics material comprises a strongly-typed parameter representing the relevant characteristics of the first graphics material.

8. The method of claim 7, wherein the strongly-typed parameters represent physical properties of the first graphics material, including at least one of a heat conductivity property, an electrical conductivity property, or a flexibility property of the first graphics material.

9. The method of claim 8, wherein the first graphics material matches the second graphics material if material parameter types associated with the first graphics material match material parameter types associated with the second graphics material.

10. The method of claim 9, wherein the material parameter types include at least one of a numerical type or a drop-down menu type.

11. The method of claim 3, wherein the first file is installed independently from the second file.

12. A computer-readable storage medium storing instructions that when executed by a processor cause the processor to extend a graphics rendering framework, by performing the steps of:
locating a first file that includes a first implementation involving a first graphics material associated with the rendering framework, wherein each graphics material defines a framework for storing data to be used when rendering geometry in a graphics scene, and each implementation provides a translation between one of the graphics materials and a different underlying rendering engine;
comparing data associated with the first file to data associated with a second file, wherein the second file includes a second implementation involving a second graphics material associated with the graphics rendering framework;
determining that the first graphics material matches the second graphics material;
determining that the first implementation provides a translation between the first graphics material and a first rendering engine and that the second implementation provides a translation between the second graphics material and a second rendering engine that is different than the first rendering engine; and
combining the data associated with the first file and the data associated with the second file into a data structure.

13. The computer-readable storage medium of claim 12, wherein the first graphics material matches the second graphics material if an identification number associated with the first graphics material matches an identification number associated with the second graphics material.

14. The computer-readable storage medium of claim 12, wherein the first graphics material matches the second graphics material if a material name associated with the first graphics material matches a material name associated with the second graphics material.

15. The computer-readable storage medium of claim 12, wherein the first graphics material matches the second graphics material if material parameters associated with the first graphics material match material parameters associated with the second graphics material.

16. The computer-readable storage medium of claim 15, wherein each of the material parameters of the first graphics material comprises a strongly-typed parameter representing the relevant characteristics of the first graphics material.

17. The computer-readable storage medium of claim 16, wherein the strongly-typed parameters represent physical properties of the first graphics material, including at least one of a heat conductivity property, an electrical conductivity property, or a flexibility property of the first graphics material.

18. The computer-readable storage medium of claim 12, wherein the first file is installed independently from the second file.

* * * * *